United States Patent
Friesel

(10) Patent No.: US 9,212,829 B1
(45) Date of Patent: Dec. 15, 2015

(54) SOLAR HEAT COLLECTOR WITH INTERNAL FOCAL POINTS

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 717 days.

(21) Appl. No.: 13/534,898

(22) Filed: Jun. 27, 2012

(51) Int. Cl.
*F24J 2/08* (2006.01)
*F24J 2/24* (2006.01)

(52) U.S. Cl.
CPC .... *F24J 2/08* (2013.01); *F24J 2/24* (2013.01); *F24J 2/085* (2013.01)

(58) Field of Classification Search
CPC ............ F24J 2/06; F24J 2/08; F24J 2/085; F24J 2/24; F24J 2/243; F24J 2/244; F24J 2/245; Y02E 10/43
USPC .......... 126/634, 651, 655, 656, 657, 698, 699
See application file for complete search history.

(56) References Cited

U.S. PATENT DOCUMENTS

| | | | | |
|---|---|---|---|---|
| 4,022,186 A * | 5/1977 | Northrup, Jr. | | 126/683 |
| 4,069,812 A * | 1/1978 | O'Neill | | 136/246 |
| 4,144,873 A * | 3/1979 | Blanton | | 126/652 |
| 4,171,695 A * | 10/1979 | Sletten | | 126/683 |
| 4,290,418 A * | 9/1981 | Uroshevich | | 126/657 |
| 4,299,201 A * | 11/1981 | Tsubota | | 126/622 |
| 4,422,434 A * | 12/1983 | Statz et al. | | 126/634 |
| 4,458,672 A * | 7/1984 | Wesley | | 126/606 |
| 4,545,366 A * | 10/1985 | O'Neill | | 126/698 |
| 4,577,620 A * | 3/1986 | Clegg | | 126/677 |
| 5,496,414 A * | 3/1996 | Harvey et al. | | 136/245 |
| 5,720,452 A | 2/1998 | Mutschler, Jr. | | |
| 6,124,980 A * | 9/2000 | Cerbell | | 359/665 |
| 6,394,395 B1 | 5/2002 | Poturalski et al. | | |
| 8,430,093 B1 | 4/2013 | Harris | | |
| 2009/0288657 A1* | 11/2009 | Nishihara | | 126/634 |
| 2011/0079267 A1* | 4/2011 | Raymond et al. | | 136/246 |
| 2012/0260906 A1* | 10/2012 | Baeten | | 126/600 |
| 2013/0255668 A1* | 10/2013 | Heaton | | 126/647 |

* cited by examiner

*Primary Examiner* — David J Laux
(74) *Attorney, Agent, or Firm* — Howard IP Law Group, PC

(57) ABSTRACT

A simple and portable solar heat collector comprises a sheet of lenses, the sheet of lenses receiving light on a first side and focusing the light at focal points on a second side; and tubing on the second side. The tubing comprises an input tube for receiving heat absorbing fluid, internal tubing for routing heat absorbing fluid through at least some of the focal points of the sheet of lenses, and an output tube for outputting heated heat absorbing fluid.

17 Claims, 7 Drawing Sheets

SOLAR HEAT COLLECTOR WITH INTERNAL FOCAL POINTS

FIELD OF THE INVENTION

The present invention relates to solar thermal energy, and more particularly to a solar heat collector with internal focal points.

BACKGROUND OF THE INVENTION

Since the discovery of electricity, the world's use of electric devices has increased many times over. Until recently, the demand for electric has been satisfied in large part using electricity generated through the burning of oil. But concerns about the limitations of the world's oil supply, as well environmental concerns, have led to a search for alternative sources to generate power.

In that regard, the use of solar power as an energy source has increased, with large solar panels becoming more common fixtures on both homes and businesses. Solar farms having thousands of solar panels to harness the power of the sun are also not uncommon. The use of solar power has led to the development of both photovoltaic and thermal types of solar panels. Photovoltaic type panels convert the solar energy to electricity, while thermal type panels convert the solar energy to heat. Both have been used as substitutes for oil-generated heat or electric.

Thermal type panels have been used for a variety of different purposes. Larger thermal panels are used in thermal solar power plants, with some of the huge, several-story high, parabolic thermal solar panels being able to generate temperatures up to 3,800 degrees Celsius (3,800° C.). Medium sized solar thermal panels have been used to heat water in a home and use large rigid panels on top of the home. Even smaller solar thermal panels, which might be used to heat pools or for space heating, involve the use of large and heavy panels.

Thus, while solar power has been used to power homes and businesses, it has not been seen as a viable power source for small-scale use, and it has not been seen as a viable portable power source. This is due in large part to the perception of solar panels as large, heavy, and unwieldy devices that are difficult to install and expensive to purchase.

Thus, smaller, lighter, easier to build, and portable thermal solar panels are desired to allow a greater use of thermal solar panels and to facilitate a change in the perception of solar power as only being usable for large scale implementations.

SUMMARY OF THE INVENTION

An embodiment of the present invention is directed to a solar heat collector that has a simple design that is easy to build, easy to configure, and which is portable. The solar heat collector comprises a sheet of lenses, the sheet of lenses receiving light on a first side and focusing light at focal points on a second side; tubing on the second side; and wherein the tubing comprises an input tube for receiving heat absorbing fluid, internal tubing for routing heat absorbing fluid through at least some of the focal points of the sheet of lenses to thereby heat the fluid, and an output tube for outputting heated heat absorbing fluid.

The sheet of lenses of the solar collector may be made of Fresnel lenses. The sheet of lenses of the solar collector may also be made of convex lenses. The tubing of the solar collector may be embedded in a substrate, and the substrate may be insulated. The solar collector may also include nodes situated at at least some of the focal points of the sheet of lenses, with the nodes connected to the internal tubing.

The solar collector is designed to be simple and easy to construct, and is also designed to be easily configurable. That being the case, the solar heat collector is adapted so that a section of the solar heat collector may be removed and functionality of the solar heat collector retained by patching gaps in the tubing. Similarly, the solar heat collector is adapted so that a section of the solar heat collector may be replaced with a replacement section. In addition, the solar heat collector is adapted so that the output tube of the solar heat collector may be connected to the input tube of an adjacent solar heat collector to create an array of solar heat collectors.

An embodiment of the present invention is also directed to a solar heat collector having a light focusing layer having lenses, the lenses receiving light on a first side and focusing the light at focal points on a second side; a heat absorbing layer on the second side; wherein the heat absorbing layer has an input for receiving a heat absorbing fluid, internal routing for routing the heat absorbing fluid through at least some of the focal points of the lenses thereby heating the fluid, and an output for heated heat absorbing fluid.

The lenses on the light focusing layer may be made of Fresnel lenses. The lenses on the light focusing layer may also be made of convex lenses. The tubing of the heat absorbing layer comprises an input which comprises an input tube, the internal routing comprises internal tubing, and the output comprises an output tube. The tubing of the solar collector may be embedded in a substrate, and the substrate may be insulated. The solar collector may also include nodes situated at at least some of the focal points of the sheet of lenses, the nodes being connected to the internal tubing.

The solar collector is designed to be simple and easy to construct, and is also designed to be easily configurable. That being the case, the solar heat collector is adapted so that a section of the solar heat collector may be removed and functionality of the solar heat collector retained by patching gaps in the tubing. Similarly, the solar heat collector is adapted so that a section of the solar heat collector may be replaced with a replacement section. In addition, the solar heat collector is adapted so that the output tube of the solar heat collector may be connected to the input tube of an adjacent solar heat collector to create an array of solar heat collectors.

DETAILED DESCRIPTION

Figure 1:
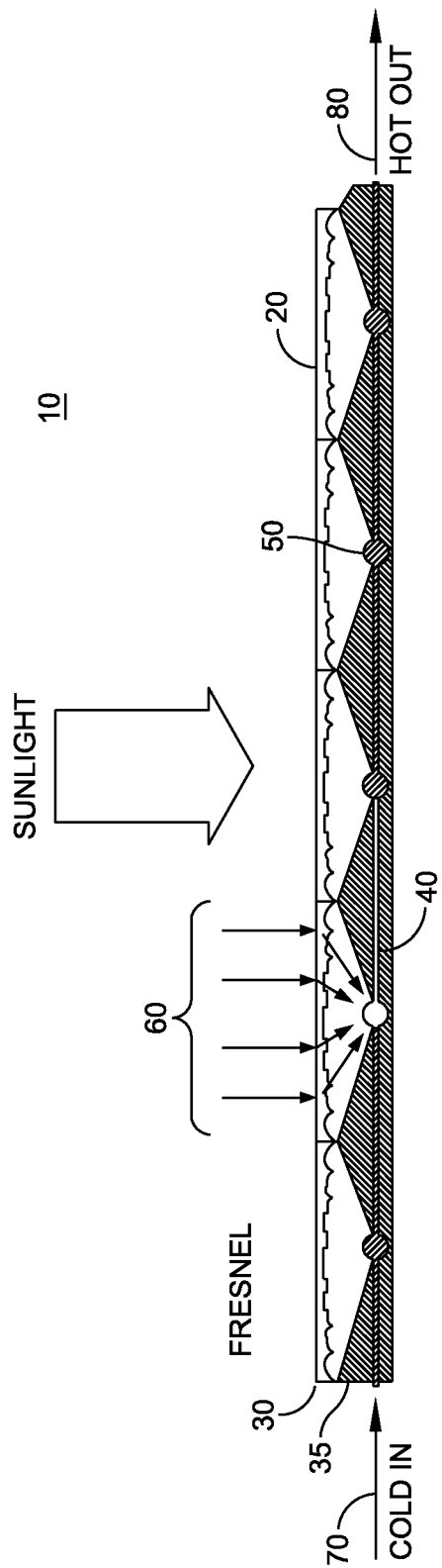
FIG. 1 is a cross-sectional elevation of a solar heat collector with internal focal points using Fresnel lenses according to an embodiment of the invention.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, such as "attached," "attaching," "mounted," and "mounting" are used interchangeably and refer to one structure or surface being secured to another structure or surface, unless expressly described otherwise.

FIG. 1 shows a partial elevation of a solar heat collector 10 according to an exemplary embodiment of the invention. In this embodiment, solar heat collector 10 includes a light focusing layer 30 which comprises a sheet of Fresnel lenses 20 and a heat absorbing layer 35 comprising internal tubing or fluid passages 40, nodes 50, input tube 70, and output tube 80. The Fresnel lenses 20 include a first side that faces the sun, the sun-facing side, and a second side that does not face the sun, the non-sun-facing side. The lenses (in this embodiment Fresnel lenses) used for the solar heat collector 10 may be miniaturized and matrixed transmissive lenses or arrays of trough lenses. The "internal" focal point structure of the solar heat collector, in which the focal points are between the light focusing layer and the heat absorbing layer, allows tubing to removed from direct contact with the external environment, which allows the collector to be more robust and to increase efficiency by reducing radiative heat loss.

As shown in FIG. 1, the heat absorbing layer has an input tube 70 and an output tube 80. In an embodiment, heat absorbing fluid such as a liquid or gas is introduced into input tube 70. The heat absorbing fluid flows through internal tubes or fluid passages 40 and nodes 50. In the nodes 50, the fluid is exposed to concentrated light at the focal point of the reflectors. In this manner the heat absorbing fluid is routed through some or all of the focal points of the reflectors, and then is outputted as heated heat absorbing fluid at a higher temperature at output 80.

In the embodiment shown in FIG. 1, each Fresnel lens receives sunlight 60 on a first, sun-facing, side and focuses and concentrates the sunlight at a focal point below the lens, on the second, non-sun-facing, side of the lens. Each of the Fresnel lenses may have the same focal length, which causes all of the focal points of all of the lenses to effectively reside in a plane parallel to the lenses, on the non-sun-facing side of the lenses. In one embodiment, the heat absorbing layer 35 is configured so that tubing or a passage 40 runs through each or some of the focal points, thereby exposing the tubing or passage 40 to concentrated light at the focal points. In another embodiment, a node 50 of the heat absorbing layer 35 is located at the focal point of each lens or some of the lenses of the solar heat collector. The nodes may be fittings that connect to tubing or may be integral to a substrate with fluid passages. For example, the nodes may be oversized with a larger surface area than the tubing, which enables more of the concentrated light to be focused on the heat absorbing fluid at the focal point. However, any specialized nodes that are used will have to be designed so that they do not unacceptably impair the flow of the heat absorbing fluid. Whether nodes or tubes or passages are located at the focal point, the thickness of the solar collector may depend in large part on the focal length of the lenses used, particularly in the embodiment using Fresnel lenses.

As will be understood, the solar heat collector may have different proportions between the nodal areas relative to the area of the internal tubing. The proportions chosen may depend on a variety of factors such as the materials used, the construction method used, the desired size of the solar heat collector, the diameter of the tubing, and the heat absorption capability of the fluid used in the tubing. In an embodiment, the solar heat collector is configured to provide for all heat absorption to occur at the nodal focal points. For modeling purposes the tubing or passages may be considered perfectly insulated (and the materials and construction method used are selected to approximate perfect insulation) so they do not lose heat that is absorbed by fluid at the nodal focal points. This embodiment may be modeled by the equation:

$$H=Nk(a-e)$$

where H=heat; k=heat per unit area of the array; N=the number of array elements; a=element area; and e=effective area per element that does not contribute heat. As will be understood, other modeling equations may be created to account for different configurations, such as solar heat collectors with less than perfect insulation or solar heat collectors that allow for a portion of the heat absorption by the fluid in the tubing or passages to occur by transfer of incidental heat of the reflectors to the tubing or passages below the reflectors.

As noted, the heat absorbing layer 35 may be comprised of tubing. The tubing used for the heat absorbing layer may be rubber or plastic or any suitable material for carrying a heat absorbing fluid within the tubing. The tubing of the heat absorbing layer may also be embedded within or integral to a substrate such as rubber or foam. In an embodiment, the heat absorbing layer is a substrate such as rubber or foam with fluid passages formed within the substrate to route the heat absorbing fluid rather than separate tubing.

In an embodiment, the heat absorbing layer 35 is configured to provide support for attaching or mounting the light focusing layer 30 to the heat absorbing layer. For example, as shown in the embodiment of FIG. 1, the heat absorbing layer 35 can include peaks between the focal points, the peaks being configured to support the light focusing layer 30. The peaks may be made from a substrate such as rubber or foam and may include connectors that allow the light focusing layer to be fixedly or removably attached to the heat absorbing layer. Other methods of attaching the light focusing layer 30 to the heat absorbing layer 35 may be used, such as adhesive, and any known method may be used as long as the attachment method does not materially interfere with the light focusing layer's ability to focus light at the focal points of its lenses. In another alternative, the heat absorbing layer 35 may be flat but may include support members (not shown) that extend from the heat absorbing layer to the light absorbing layer. The support members may include connectors that allow the light focusing layer to be fixedly or removably attached to the heat absorbing layer. Alternatively, the support members may be part of the light focusing layer, and extend from that layer to the heat absorbing layer.

The sizing of the tubing or passages in a substrate is selected to ensure that the heat absorbing fluid may flow through the tubing or passage as desired, throughout the entire solar heat collector. The passages or tubing have to be large enough not to restrict flow, and the viscosity of the heat absorbing fluid is taken into account to insure that flow will be as desired. Different methods may be used to cause liquid or gas flow from one end of the solar heat collector to the other such as pressure differential at the input and output. For example, an appropriately sized pump may be used to effect the fluid flow. In another embodiment, gravity may be used to effect flow. In yet other embodiments, Bernoulli's principle, electrostatic or induction methods using charged or magnetized fluids, vibration, or thermal expansion using tubing constructed with 1-way valves may be used to effect flow. In addition, the weight of the heat absorbing fluid may also be taken into account if the solar heat collector will be used in a portable fashion, and the relative ability of the chosen fluid to absorb heat is also a factor when considering various heat absorbing fluids. Furthermore, the rate of flow may be chosen so that the fluid in the heat absorbing layer is heated a desired amount. For example, a slower flow rate may cause the fluid to heat to a higher temperature because a slower flow rate may result in the fluid spending more time at the focal points exposed to concentrated light. Factors such as the size of the tubing, the surface area of the nodes, the number of light concentrators, the size and heating capacity of the light concentrators, the fluid temperature at the input, and the desired fluid output temperature may be considered when selecting a flow rate. In addition, particularly where small tubing will be used, viscosity or hydraulic resistance may be an important factor in the selection of the size of the tubing, materials used for the tubing, type of fluid used, and flow method used. Similarly, the tubing layout may impact the size of the tubing, fluid used, and flow method, as the presence of joints and bends may affect the flow of fluid.

The heated heat absorbing fluid may then be used to generated power. For example, in an embodiment, the heat absorbing fluid from the output tube 80 is used to generate steam which powers a turbine that drives an electric generator. In another embodiment, the heat absorbing fluid is water, and the heated water at the output tube 80 may be used for a shower, sterilizer, cooking, or for any purpose requiring heated water.

The solar heat collector may also have other layers not shown in FIG. 1. For example, the solar heat collector may include a base layer below the heat absorbing layer (i.e., furthermost from layer 30). The base layer could be separate from the heat absorbing layer, or it could be combined with that layer. The base layer could be made of an insulating material such as rubber or foam to help the heat absorbing layer retain heat, or alternatively the base layer could be made of a protective material to protect the tubing or passages of the heat absorbing layer from rough surfaces that the solar heat collector might be place upon. Suitable materials for the base material such as rubber or foam may be selected so that the solar heat collector is flexible.

Figure 2:
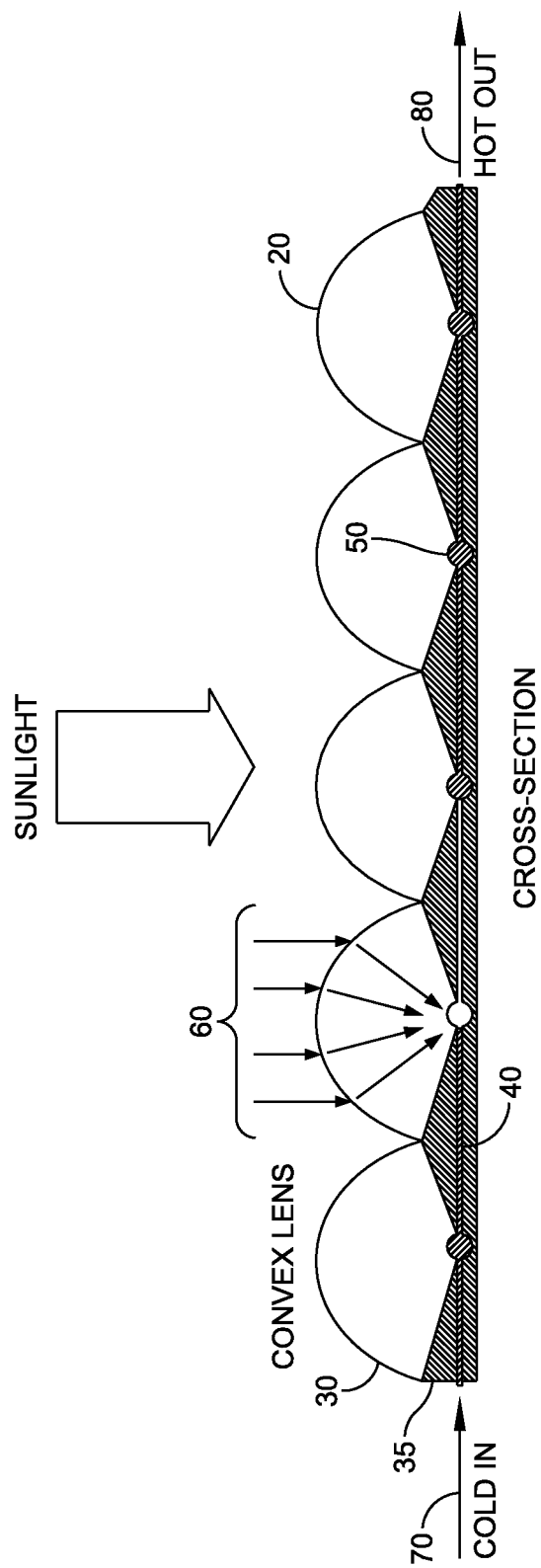
FIG. 2 is a cross-sectional elevation of a solar heat collector with internal focal points using convex lenses according to an embodiment of the invention.

FIG. 2 shows a partial elevation of an alternative embodiment of a solar heat collector 10 of the invention. In this embodiment, solar heat collector includes a light focusing layer 30 which comprises a sheet of convex lenses 20 and a heat absorbing layer 35 comprising tubing or passages 40, nodes 50, input tube 70, and output tube 80. In the embodiment shown in FIG. 2, each convex lens focuses sunlight 60 on nodes 50 of heat absorbing layer 35. As noted, the nodes may be specialized fittings that enable more of the light to be focused on the heat absorbing fluid within the tubes. Or, alternatively, nodes do not have to be used and the portion of the heat absorbing layer at the focal points may be tubing 40 or passages formed within a substrate.

Figure 3:
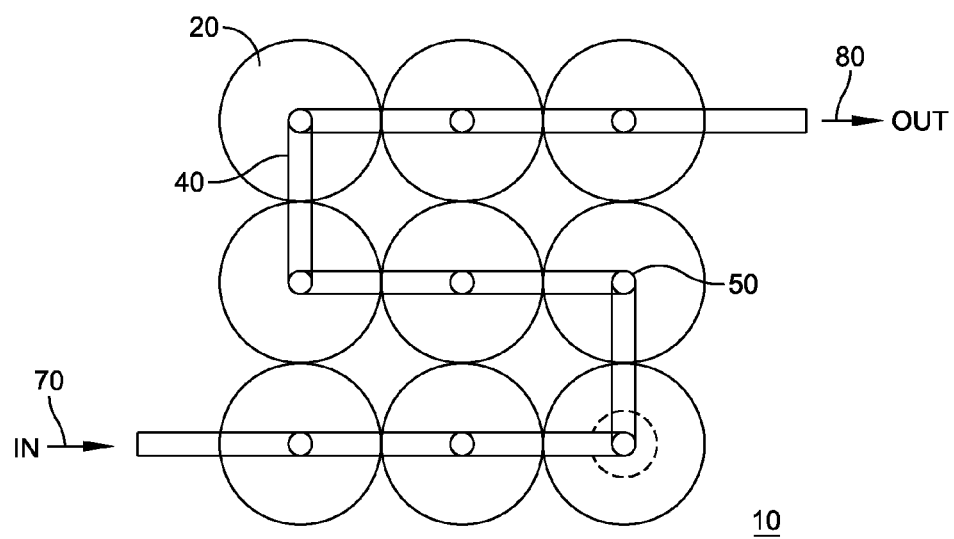
FIG. 3 is a partial plan view of a solar heat collector showing one embodiment of the tubing routing.

FIG. 3 is a partial plan view of a solar heat collector embodiment of the invention showing an exemplary routing of the heat absorbing fluid within the collector. The embodiment of FIG. 3 shows an embodiment of the tubing in which fluid or gas enters though the input tube 70, then flows through the tubing or passages 40, flows through nodes 50 at the focal points of the lenses, and then exits through output tube 80. The tubing configuration creates a continuous path for the heat absorbing fluid from the input to the output.

Figure 4:
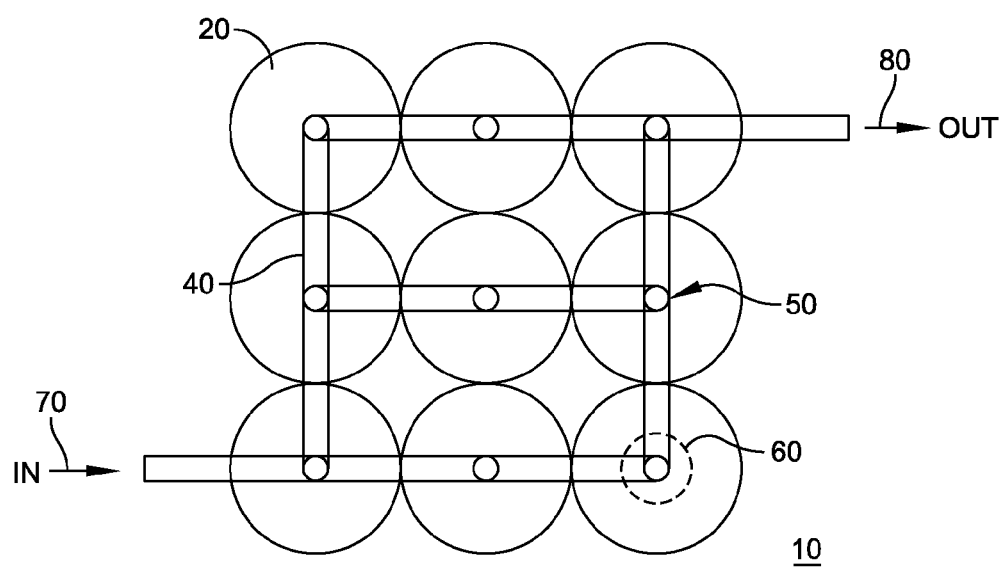
FIG. 4 is a partial plan view of a solar heat collector showing another embodiment of the tubing routing.

FIG. 4 shows a plan view of an alternative routing for the heat absorbing fluid. In this layout, tubes or passages 40 form parallel paths within the solar heat collector. Alternative layouts are possible as long as fluid flow is considered and appropriate means such as fluid differential or other means are used to insure that the fluid or gas flows from the input tube 70, through the tubes or passages 40, through the nodes 50 at the focal points of the lenses, and then through output tube 80. In other embodiments, multiple input tubes or output tubes could be used as long as flow of the heat absorbing fluid is maintained from the input(s) to the output(s).

In one embodiment, the entire solar heat collector is adapted so it is built of materials that may be easily cut, which allows the solar collector to be sized, shaped, or trimmed in the field as desired. For example, the light focusing layer may be constructed from a flexible Fresnel lens sheets that are cuttable. The heat absorbing layer may be constructed from rubber material with embedded or integral rubber tubing to route the heat absorbing fluid.

Adapting the solar heat collector so it is constructed from easily cuttable (for example by scissors or shears) materials would make it possible to remove sections of the collectors as desired, for example if certain parts of the collector need to be removed to physically fit a particular application or if certain parts of the collector need to be removed because they are damaged. Functionality of the collector may be retained by patching any gaps in the tubing caused by the removal of a section. The gaps may be patched with tubing patches and/or fittings as desired.

Figure 5:
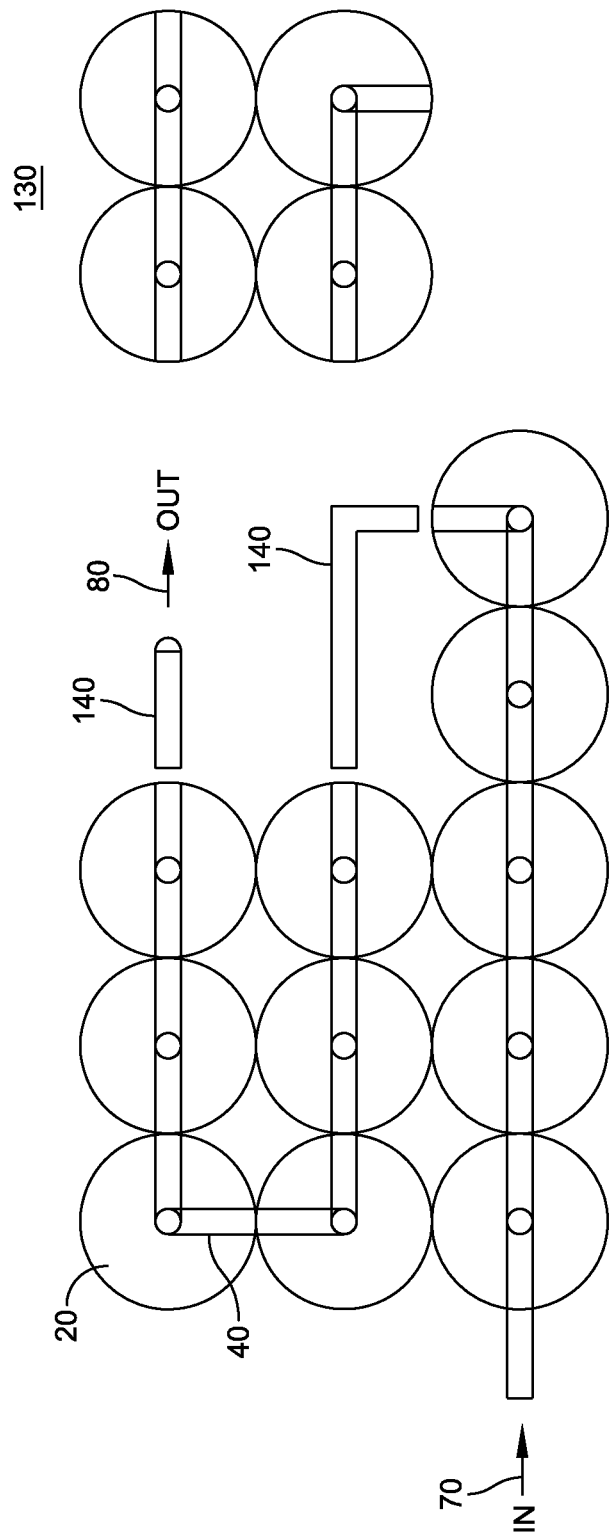
FIG. 5 is a plan view of a solar heat collector with a removed section and patch tubing to retain functionality of the solar heat collector.

For example, FIG. 5 shows an example of a solar heat collector 10 in which a section 130 of the collector has been removed. As shown, any gaps in the tubing may be patched with tubing patches 140, which maintains the continuous flow of the heat absorbing gas or fluid. Tubing patches may be joined to the remaining tubing through the use of appropriate fittings as are known in the art. The appropriate type of fitting may depend on the type of heat absorbing fluid used and the size of the fitting will depend on the size of the tubing or passages. In an exemplary embodiment, the tube routing for each solar heat collector is physically stenciled or otherwise shown on each solar heat collector itself, perhaps on the underside of the heat collector. Then, when patches or replacements are required, the fluid path is known so appropriate patches with tubing and/or fittings may be made.

Figure 6:
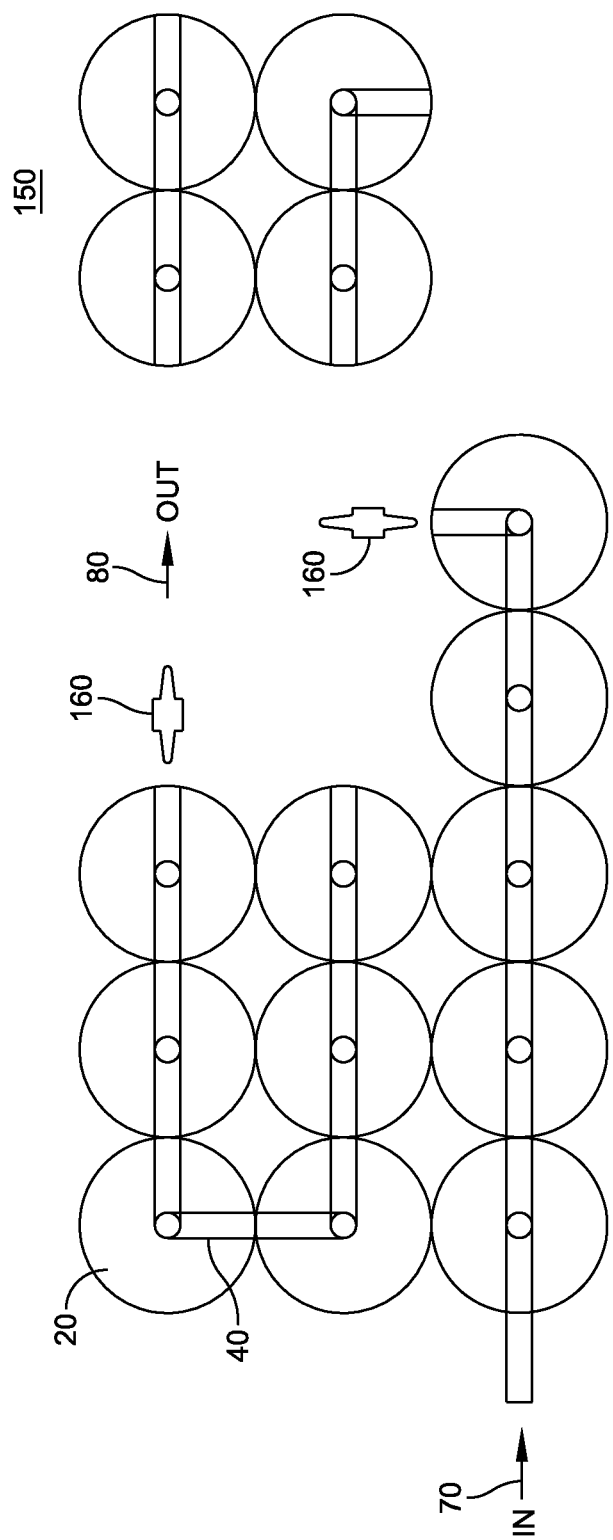
FIG. 6 is a plan view of a solar heat collector with a replacement section and fitting to allow connection of the replacement section to the solar heat collector.

FIG. 6 shows an example of a solar heat collector in which a section of the collector is being replaced. In this embodiment, section 150 is a replacement section for a section that has been removed (not shown) because it has been damaged or is otherwise non-functional. In the case of a replacement section, appropriate tubing fittings 160 as are known in the art may be used that will allow section 150 to be snugly installed adjacent to the existing solar heat collector. The tubing fittings 160 allow the continuous path for the heat absorbing fluid to be maintained, and also provide structural support so that the replacement section is structurally integrated to the original solar heat collector that is being repaired. Additional structural support such as tape, glue, support pieces, or a backing layer (not shown) may be used as desired depending on the size and location of the replacement section.

Figure 7:
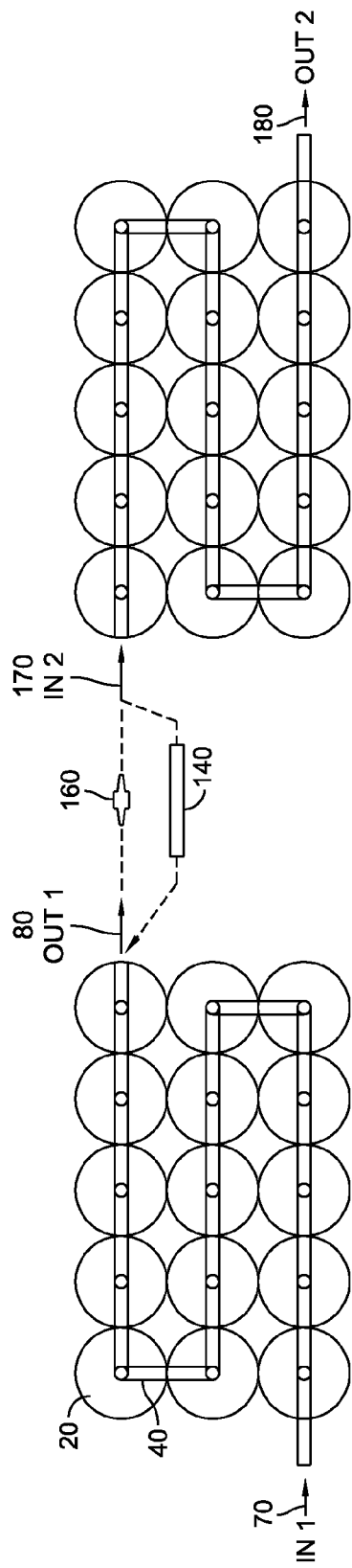
FIG. 7 is a plan view of a first solar heat collector and a second solar heat collector, and fitting and/or tubing to allow connection of the collectors.

Tubing patches and/or fittings may also be used to connect separate solar heat collectors to each other to create an array of solar heat collectors. In the embodiment shown in FIG. 7, the output tube 80 of a solar heat collector 10 is connected to the input tube 170 of an adjacent solar heat collector 15 to create an array of two heat collectors. The input and output tubes of the solar heat collectors may be adapted to allow connection to an adjacent collector, and the connection may be made using tubing or appropriate fittings as desired. For example, if it is desired that adjacent collectors sit closely to or against each other, fittings 160 may be used. If it is desired that the collectors not sit closely or against each other, tubing 140 and fittings 160 may be used to connect the individual solar heat collectors to each other. Using fittings 160 and/or tubing 140, any number of individual solar heat collectors may be attached together, subject to the limitation that the method (such as pressure differentiation) used to move the fluid or gas within the tubes from the beginning input port 70 to the final output port (180 in this example) should be sufficient to maintain flow from the first to last solar heat collector in the array. Additional structural support such as tape, glue, or support pieces (not shown) may be used as desired depending on the size and location of the adjacent sections. Alternatively, a backing layer or substrate may be used to support the separate collectors. The portability of the solar heat collectors and their easy connectability permit arrays to be constructed as desired.

The features of the solar concentrator have been disclosed, and further variations will be apparent to persons skilled in the art. All such variations are considered to be within the scope of the appended claims. Reference should be made to the appended claims, rather than the foregoing specification, as indicating the true scope of the disclosed invention.

The features of FIGS. 1-7 are not exclusive. Other structures may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A solar heat collector comprising:
   a sheet of lenses, the sheet of lenses receiving light on a first side and focusing light at focal points on a second side;
   tubing on the second side of the sheet of lenses, wherein the tubing comprises an input tube for receiving heat absorbing fluid, internal tubing for routing heat absorbing fluid through at least some of the focal points of the sheet of lenses, and an output tube for outputting heated heat absorbing fluid; and
   nodes situated at at least some of the focal points of the sheet of lenses, wherein the nodes are connected to the internal tubing.

2. The solar heat collector of claim 1,
   wherein the solar heat collector is adapted to permit removal of a section of the solar heat collector and further comprising patch tubing for maintaining a continuous path for the heat absorbing fluid.

3. The solar heat collector of claim 1,
   wherein the solar heat collector is adapted to permit removal of a section of the solar heat collector and replacement of the removed section with a replacement section.

4. The solar heat collector of claim 1,
   wherein the output tube of the solar heat collector is adapted to connect to the input tube of an adjacent solar heat collector to create an array of solar heat collectors.

5. The solar heat collector of claim 1, wherein the sheet of lenses comprises Fresnel lenses.

6. The solar heat collector of claim 1, wherein the sheet of lenses comprises convex lenses.

7. The solar heat collector of claim 1, wherein the tubing on the second side of the sheet of lenses is embedded in a substrate.

8. A solar heat collector comprising:
   a light focusing layer having lenses, the lenses receiving light on a first side and focusing the light at focal points on a second side;
   a heat absorbing layer on the second side of the light focusing layer;
   wherein the heat absorbing layer has an input for receiving a heat absorbing fluid, passages for routing the heat absorbing fluid through at least some of the focal points of the lenses, and an output for heated heat absorbing fluid;
   wherein the input comprises an input tube, the passages for routing comprises internal tubing, and the output comprises an output tube; and
   nodes situated at at least some of the focal points, wherein the nodes are connected to the internal tubing.

9. The solar heat collector of claim 8, wherein the heat absorbing layer comprises a substrate.

10. The solar heat collector of claim 8,
    wherein the solar heat collector is adapted to permit removal of a section of the solar heat collector and further comprising patch tubing for maintaining a continuous flow of the heat absorbing fluid.

11. The solar heat collector of claim 8,
    wherein the solar heat collector is adapted to permit removal of a section of the solar heat collector and replacement of the removed section with a replacement section.

12. The solar heat collector of claim 8, wherein the output tube of the solar heat collector is adapted to connect to the input tube of an adjacent solar heat collector to create an array of solar heat collectors.

13. The solar heat collector of claim 8, wherein the lenses of the light focusing layer are Fresnel lenses.

14. The solar heat collector of claim 8, wherein the lenses of the light focusing layer are convex lenses.

15. The solar heat collector of claim 8, wherein the heat absorbing layer comprises a substrate.

16. The solar heat collector of claim 15, wherein the internal tubing is embedded in the substrate.

17. The solar heat collector of claim 15, wherein the substrate is insulated.

* * * * *